March 20, 1928.
J. W. MEADOWCROFT
ELECTRODE CLAMP
Filed Jan. 31, 1925
1,663,258
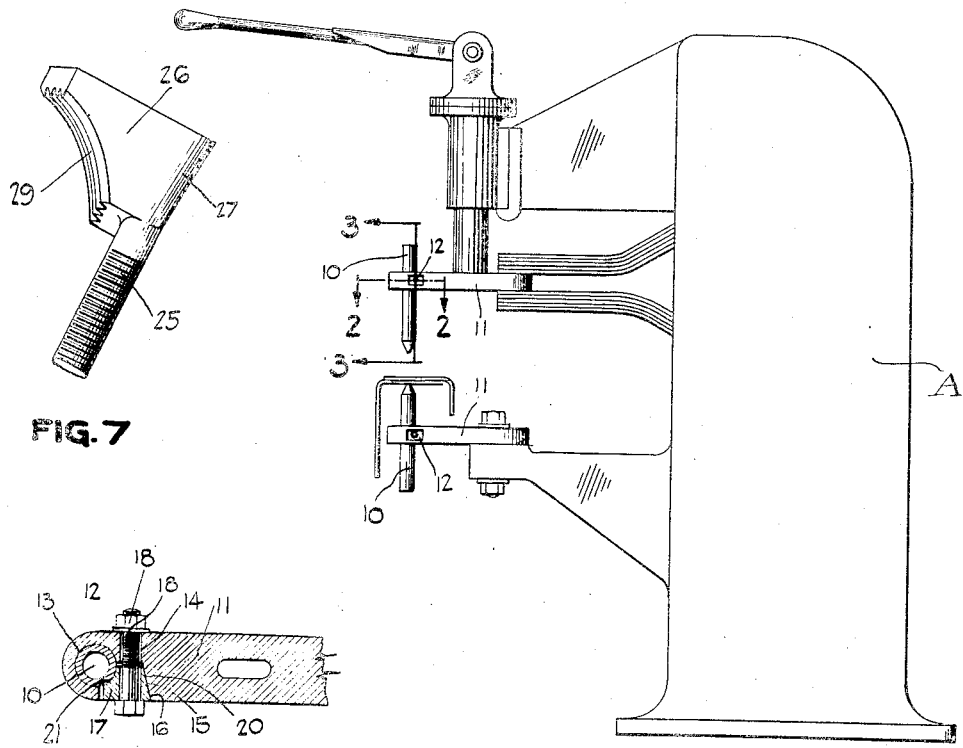
INVENTOR.
JOSEPH W. MEADOWCROFT
BY
ATTORNEY.

Patented Mar. 20, 1928.

1,663,258

UNITED STATES PATENT OFFICE.

JOSEPH W. MEADOWCROFT, OF PHILADELPHIA, PENNSYLVANIA, ASSIGNOR TO EDWARD G. BUDD MANUFACTURING CO., OF PHILADELPHIA, PENNSYLVANIA, A CORPORATION OF PENNSYLVANIA.

ELECTRODE CLAMP.

Application filed January 31, 1925. Serial No. 6,046.

My invention relates to an improved device for releasably locking or clamping in position the electrodes used in electrical welding machines. As is well known by those familiar with the art, these electrodes are usually held in place by set screws or by wedges which are adapted to be driven tightly in place between the electrode and its seat. The use of set screws makes it very difficult to securely position the electrode in its arm or holder against displacement, since the screws are apt to become loosened under the continual pounding of the electrodes on the work. In consequence of this displacement of the welding electrodes in their seats the welding machine may be entirely put out of commission.

The use of wedges adapted to be driven against the electrode has its disadvantages also. It is the usual practice when using this type of securing means to force the wedges in against the electrode so tightly that they are not easily removable. It is often the case that the electrodes are only able to be removed after the operator has hammered at the electrode supporting arm in order to start the wedges. This means that the arm, which is made of copper and easily dented, is more or less injured.

A common practice for seating the electrode in its seat has been to provide screw threads on its surface so that it may be threadedly received within a socket. Such a threaded surface has proved to be a ready collecting medium for the molten copper which is spattered about during the welding operations. This molten metal settles between the threads on the electrode so as to destroy their effectiveness, and, as is often the case even with smooth surfaced electrodes, tends to "cement" the electrode to its holder. In either event ready removal or replacement of the electrode from or in its holder is prevented. By means of my invention it becomes possible to use an electrode which has a smooth surface such as would offer a minimum of attraction for the objectionable free molten metal. It is an object of my invention to provide a clamping device for supporting an electrode in its seat which will not be rendered inoperative and useless because of the continual splattering of molten metal thereupon during the welding operations.

It is another object of this invention to provide a device for clamping the electrode in its supporting arm which may be as easily released as it is applied. A further object is to facilitate adjustment of the electrode, and its removal if that is desired. A still further object of my invention is to provide a new type of wedging means whereby the use of a driving force in the hands of the operator such as a hammer, mallet or similar device is avoided. Other objects of my invention will appear more fully hereinafter.

In the accompanying drawings:

Fig. 1 is a side elevation of a welding machine showing the application thereto of the electrode clamping device embodying my invention.

Fig. 2 is a sectional view of the clamping device on the line 2—2 of Fig. 1.

Fig. 3 is a sectional view of the clamping device on the line 3—3 of Fig. 1.

Fig. 4 is a side elevation of another application of the electrode clamping device.

Fig. 5 is a sectional view through the clamp taken on the line 5—5 of Fig. 4.

Fig. 6 is a sectional view through the clamp taken on the line 6—6 of Fig. 5, and Fig. 7 is a perspective view of the clamping element itself as used in Figs. 4, 5 and 6.

In the drawings, the same reference numerals refer to similar parts throughout the several views.

In general, my invention consists in the provision of an electrode clamping device for securing an electrode in its supporting arm. This clamping device is essentially one of the wedge type wherein the electrode is, by means of the wedge, forced into its seat. The electrode seat is formed by providing an opening through the copper arm of the welding machine which opening extends vertically through said arm. The electrode is adapted to be more or less loosely fitted into said opening. Transversely disposed with respect to this vertically extending electrode seat or opening, is a passage extending through from one side of the arm to the other side. This passage, while it is continuous in extent, is in reality in two separate parts, one part of which is in the shape of a slot which is in communication with a portion of the electrode seat. The other part of this passage is merely an opening leading from the inner side of said slot to the far side of the supporting arm. It is in alignment with that end of the slot which is not in communication with the electrode seat.

A wedging member which is to be more specifically described hereinafter is adapted to be fitted into the above described slot or recess and a means is provided for positively drawing the wedging member into the slot and so into the electrode receiving opening.

Fig. 1 shows generally, as is indicated by the reference character A, a welding machine of the usual type in which my invention is applied. This machine is provided with the welding electrodes 10—10 which are secured in their respective supporting arms 11—11 by the clamping means indicated generally by the reference numeral 12.

Figs. 2 and 3 show a particular form of my invention in which the arm of the electric welding machine is indicated by 11. At the outer end of this arm is provided a vertically extending opening 13 through which freely extends the electrode 10. To one side of this vertically extending opening 13 is provided a passage 14 extending at right angles thereto. This passage extends halfway through the electrode supporting arm. At the inner end of the passage 14 is provided a continuation thereof in the form of a slot indicated by 15. The side of the slot 15 which is offset from the axis of the passage 14 communicates with the opening 13 for the purpose to be hereinafter explained. The wall of the slot which is removed from the opening 13 is tapered as is indicated by 16.

The wedge for use in my invention is, as shown in Figs. 2 and 3, comprised of two separate parts, in which 17 is the wedge element per se and 18 is a member (in this case in the form of a bolt) for drawing the wedge into engagement with the electrode. The wedging element 17 is provided with an opening 19 through which the bolt 18 projects when the wedge element is in place in its seat. One edge of the wedging element is tapered as indicated at 20 to correspond with the tapered wall 16 of the recess 15. Opposite to this tapered edge, the wedging element is provided with an arched surface 21 which engages the electrode on the quarter nearest itself.

In the use of my device, as shown in Figs. 2 and 3, the electrode is positioned in its seat 13 in the arm 11 and by means of the bolt 18 and nut 18', the wedging element is drawn into its receiving recess 15 in such manner that the arched surface 21 thereof engages the curved surface of the electrode and the complementally tapered surfaces 15 and 16 act to force it tightly into its seat.

Figs. 4, 5, 6 and 7 show the preferred embodiment of my invention. The electrode supporting member comprising the arm with its vertically extending opening, transversely extending passage and the offset recess is essentially the same as that which has already been described in connection with Figs. 2 and 3. The wedge in this case is an integral, unitary structure and comprises a shank member 25 which is screw threaded and a head member 26 integrally united thereto. The wedge element as used in my preferred embodiment is tapered on one side, as at 27, and is arched at the other side as is indicated by 28. The electrode engaging arch-shaped portion 28 is provided with a series of thread-like serrations 29, as is well indicated in Figs. 6 and 7.

Figs. 4 and 5 show my invention as applied specifically to an element in an automatic circuit maker and breaker wherein the electrode is the contact element and wherein the clamping device acts to securely hold this contact element in place. Except for this and the addition of the base 30, the electrode supporting structure is the same as has been above described. There is provided the same transversely extending passage 14, as was described before, together with the recess 15 which is in communication with the electrode seat 13. In each case it is designed that the thickness of the head be uniformly equal to the diameter of the screw-threaded shank.

In use, the device as described in Figs. 4 to 7, is exactly like that of Figs. 2 and 3. The shank 25 of the wedge member is inserted through the passage 14 at the same time seating the head 26 in the recess 15. A nut 31 is threaded upon the projecting end of the shank 25 with a lock washer in advance. When the nut is tightened the wedge 26 is not only drawn in toward the electrode seat 13 in such manner that the serrated surface 28 has a wedging engagement with the surface of the electrode, but also the tapered surfaces 15 and 16 will force the serrations 29 over toward and cause them to bite strongly into the engaged surface of the electrode. So the electrode is not only clamped firmly in its seat but is also firmly locked against axial displacement under the heavy welding pressures.

It will be at once apparent that by means of my clamping device, the electrode is clamped in position by forces applied to it in two different directions. One of these forces is purely a wedging force due to the action of the tapered edge of the head 27 acting on the wall of the passage 14 and the other of these forces is that due to the drawing force of the offset portion of the head 26 in a line substantially parallel to the shank. The resultant force is applied to the electrode by my wedging means to securely and positively clamp it in position by tightening the nut 18' as in Fig. 2 or 25 as in Fig. 5.

This resultant force is applied to the surface of the electrode in a direction and on a line through the arched surface of the wedging element, so that in addition to acting as a means for firmly seating the electrode in its seat the arched surface of the wedge acts complementally with the inner surface of the electrode seat to form a tight, enclosing seat for the electrode. Further, by means of the arched surface it becomes possible for the wedging element to engage the surface of the electrode at more than just a single point, thus insuring a much better contact than has heretofore been possible.

I am aware that the embodiment which I have shown and described may be varied considerably without departing from the spirit of my invention and therefore I desire to claim my invention broadly as indicated by the appended claims.

What I claim is:

1. In a device of the class described, an electrode holder provided with a seat for reception of an electrode and a transverse passage extending through said holder to one side of said seat and, said passage having an off-set portion in communication with said seat, an electrode clamping member having one arm projecting through said transverse passage and another arm seated in the offset portion thereof, the rear edge of the second-mentioned arm being inclined with respect to the axis of the first-mentioned arm.

2. As an article of manufacture, an electrode clamping element comprising a screw-threaded shank, a head having an offset portion integrally formed therewith, an inclined surface at the base of said head, and a nut coacting with said screw threaded shank whereby to lock the clamping element in engagement with the electrode.

3. As an article of manufacture, an electrode clamping element comprising a screw threaded shank, a head having an offset portion integrally formed therewith, an inclined surface at the base of said head and an arched, clamping surface at the inner side of said offset portion, and a nut coacting with said screw threaded shank whereby to lock the clamping element in engagement with the electrode.

4. In a device of the class described, an electrode holder provided with a seat for the reception of an electrode, a transverse passage at one side of said seat, an electrode clamping member movable in said passage and having an extended arc of contact with the electrode, and means for advancing said clamping member radially of its arc of contact toward the center of the electrode.

5. In a device of the class described, an electrode holder provided with a seat for the reception of an electrode, a transverse passage at one side of said seat having an inclined wall, an electrode clamping member having an offset rear edge coacting with an inclined wall of its passage, and means for advancing said clamping member in said passage, whereby the resultant of the clamping force is at an angle to the passage.

6. As an article of manufacture a clamping member having an arc shaped clamping surface and provided with means for application of clamping force eccentrically of said arc shaped surface and also with means to translate the eccentrically applied force to concentrically applied force.

7. As an article of manufacture a clamping member having an arc shaped clamping surface, said arc shaped surface being longitudinally serrated throughout the length of the arc and provided with means for application of clamping force eccentrically of said arc shaped surface and also with means to translate the eccentrically applied force to concentrically applied force.

In testimony whereof I hereunto affix my signature.

JOSEPH W. MEADOWCROFT.